United States Patent
Levi et al.

(10) Patent No.: US 11,641,245 B2
(45) Date of Patent: May 2, 2023

(54) TIMESTAMP CONFIDENCE LEVEL

(71) Applicant: MELLANOX TECHNOLOGIES, LTD., Yokneam (IL)

(72) Inventors: Dotan David Levi, Kiryat Motzkin (IL); Wojciech Wasko, Młynek (PL); Natan Manevich, Ramat Hasharon (IL); Roee Moyal, Yokneam Illit (IL); Eliel Peretz, Kiryat Motzkin (IL); Eran Ben Elisha, Yokneam Illit (IL); Ariel Almog, Kohav Yair (IL); Teferet Geula, Ma'ale Adumim (IL); Amit Mandelbaum, Teqoa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 38 days.

(21) Appl. No.: 17/246,730

(22) Filed: May 3, 2021

(65) Prior Publication Data

US 2022/0352998 A1 Nov. 3, 2022

(51) Int. Cl.
*H04J 3/06* (2006.01)
*H04L 43/0817* (2022.01)
*H04L 43/0882* (2022.01)
*H04L 67/55* (2022.01)

(52) U.S. Cl.
CPC ............ *H04J 3/065* (2013.01); *H04J 3/0644* (2013.01); *H04L 43/0817* (2013.01); *H04L 43/0882* (2013.01); *H04L 67/55* (2022.05)

(58) Field of Classification Search
CPC ......... H04J 3/065; H04J 3/0644; H04L 67/55; H04L 43/0817; H04L 43/0882; H04L 12/403; H04L 7/0012
See application file for complete search history.

(56) References Cited

U.S. PATENT DOCUMENTS

| | | | |
|---|---|---|---|
| 7,080,160 B2 | 7/2006 | Net et al. | |
| 8,243,727 B2* | 8/2012 | Closset | H04J 3/0647 370/362 |
| 8,370,675 B2 | 2/2013 | Kagan | |
| 8,446,896 B2 | 5/2013 | Bedrosian | |
| 8,576,883 B2* | 11/2013 | Lansdowne | H04J 3/0673 370/503 |
| 8,665,724 B2 | 3/2014 | Stanwood et al. | |
| 8,719,452 B1* | 5/2014 | Ding | H04N 21/4344 709/248 |
| 8,898,317 B1 | 11/2014 | Armstrong et al. | |

(Continued)

OTHER PUBLICATIONS

IEEE Std 1588™—2002, "IEEE Standard for a Precision Clock Synchronization Protocol for Networked Measurement and Control Systems", IEEE Instrumentation and Measurement Society, pp. 1-154, Nov. 8, 2002.

(Continued)

*Primary Examiner* — Chandrahas B Patel
(74) *Attorney, Agent, or Firm* — Kligler & Associates Patent Attorneys Ltd

(57) ABSTRACT

In one embodiment, an event processing system includes a clock configured to provide time values, and event processing circuitry, which is configured to generate a confidence level indicative of a degree of confidence of an accuracy of a timestamp, the timestamp being generated for an event responsively to a time value indicative of when an operation associated with the event occurred.

42 Claims, 10 Drawing Sheets

(56) References Cited

U.S. PATENT DOCUMENTS

| | | |
|---|---|---|
| 8,976,778 B2 | 3/2015 | Bedrosian |
| 9,031,071 B2 | 5/2015 | Conner et al. |
| 9,077,667 B2 | 7/2015 | Sridhar |
| 9,204,408 B2 | 12/2015 | Hirota |
| 9,226,252 B2 | 12/2015 | Akhlaq et al. |
| 9,723,579 B2 | 8/2017 | Chihara et al. |
| 10,320,952 B2 | 6/2019 | Raveh et al. |
| 10,433,270 B1 * | 10/2019 | Arab ................ H04W 56/001 |
| 10,523,352 B2 | 12/2019 | Stein et al. |
| 2017/0374633 A1 | 12/2017 | Li et al. |
| 2019/0056972 A1 | 2/2019 | Zhou et al. |
| 2019/0140957 A1 | 5/2019 | Johansson et al. |

OTHER PUBLICATIONS

IEEE Std 1588™—2008, "IEEE Standard for a Precision Clock Synchronization Protocol for Networked Measurement and Control Systems", pp. 1-289, Jul. 24, 2008.
U.S. Appl. No. 17/520,674 Office Action dated Aug. 18, 2022.

* cited by examiner

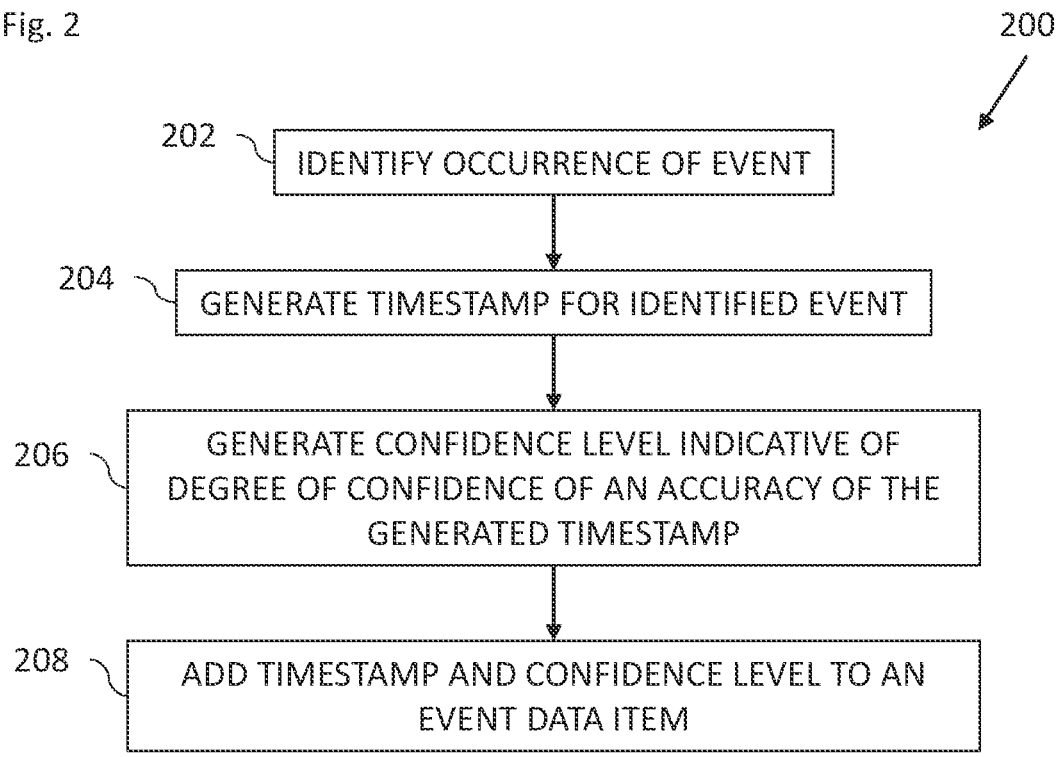
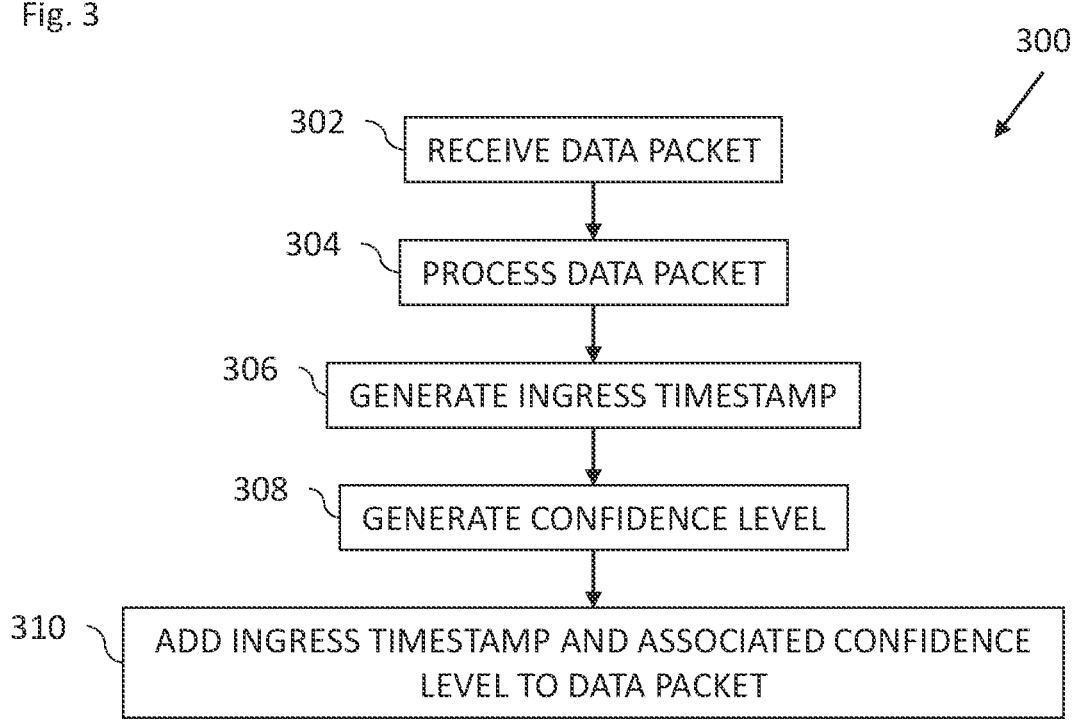

TIMESTAMP CONFIDENCE LEVEL

FIELD OF THE INVENTION

The present invention relates to computer systems, and in particular, but not exclusively, timestamps.

STATEMENT REGARDING SPONSORED RESEARCH OR DEVELOPMENT

The project leading to this application has received funding from the European Union's Horizon 2020 research and innovation program under grant agreement No 957403.

BACKGROUND

Hardware timestamping is used in many network applications. One application of hardware timestamping in network devices is measuring packet ingress or egress time. The timestamping information may then be used to establish clock synchronization across multiple systems which is a prerequisite for many modern distributed system applications, including large datacenter applications and Radio Access Networks for wireless technologies such as 5G. Timestamping may also be used to create external consistency, unified logs and events across different network nodes.

For example, U.S. Pat. No. 8,370,675 to Kagan describes a method for clock synchronization including computing an offset value between a local clock time of a real-time clock circuit and a reference clock time, and loading the offset value into a register that is associated with the real-time clock circuit. The local clock time is then summed with the value in the register so as to give an adjusted value of the local clock time that is synchronized with the reference clock.

U.S. Ser. No. 10/320,952 to Raveh, et al., describes a network device including multiple ports, for communicating over a communication network, and packet processing circuitry. The packet processing circuitry is configured to receive via the ports packets belonging to a plurality of multicast flows, to receive, for each of the multicast flows, (i) a first configuration that specifies clients that are to receive the multicast flow prior to a specified switch-over time, and (ii) a second configuration that specifies the clients that are to receive the multicast flow after the specified switch-over time, to forward the multicast flows via the ports in accordance with the first configuration, to extract from a field in at least one of the packets a value that is indicative of the switch-over time, and, based on the extracted value, to switch-over forwarding of the multicast flows from the first configuration to the second configuration simultaneously at the switch-over time.

SUMMARY

There is provided in accordance with an embodiment of the present disclosure, an event processing system, including a clock configured to provide time values, and event processing circuitry, which is configured to generate a confidence level indicative of a degree of confidence of an accuracy of a timestamp, the timestamp being generated for an event responsively to a time value indicative of when an operation associated with the event occurred.

Further in accordance with an embodiment of the present disclosure the event processing circuitry is configured to identify occurrence of the event, and generate the timestamp for the identified event responsively to the time value indicative of when a hardware operation associated with the event occurred.

Still further in accordance with an embodiment of the present disclosure the event processing circuitry is configured to add the timestamp and the confidence level to an event data item.

Additionally, in accordance with an embodiment of the present disclosure the event data item is a packet notification message.

Moreover, in accordance with an embodiment of the present disclosure the event data item is a clock synchronization message.

Further in accordance with an embodiment of the present disclosure the event processing circuitry is configured to generate the confidence level responsively to any one or more factors selected from a traffic pattern during occurrence of the event, a line speed during occurrence of the event, a bandwidth value during occurrence of the event, a steering engine used during occurrence of the event, hardware performing the hardware operation, a clock state, a queue occupancy, or a PHY protocol used to perform the hardware operation.

Still further in accordance with an embodiment of the present disclosure, the system includes a network interface configured to receive a data packet over a packet data network, and packet processing circuitry configured to process the received data packet, and wherein the event includes the data packet being received by the packet processing circuitry at the time value, and the event processing circuitry is configured to add the timestamp and the confidence level to the data packet.

Additionally in accordance with an embodiment of the present disclosure the event processing circuitry is configured to generate the confidence level responsively to any one or more ingress factors selected from a location of the data packet in a packet processing pipeline when the timestamp was generated, a traffic pattern during ingress of the data packet, a line speed during ingress of the data packet, a bandwidth value during ingress of the data packet, an ingress queue occupancy, a clock state, or a steering engine used during ingress of the data packet.

Moreover in accordance with an embodiment of the present disclosure, the system includes a network interface configured to send a data packet over a packet data network, and packet processing circuitry configured to process the data packet for sending via the network interface over the packet data network, and wherein the event includes the data packet being sent over the packet data network at the time value, and the event processing circuitry is configured to add the timestamp and the confidence level to the data packet.

Further in accordance with an embodiment of the present disclosure, the system includes an egress buffer configured to store the data packet prior to sending the data packet over the packet data network, wherein the event processing circuitry is configured to generate the confidence level responsively to a buffer level of the egress buffer at the time value.

Still further in accordance with an embodiment of the present disclosure the event processing circuitry is configured to generate the confidence level responsively to any one or more egress factors selected from a location of the data packet in a packet processing pipeline when the timestamp was generated, a traffic pattern during egress of the data packet, a line speed during egress of the data packet, a bandwidth value during egress of the data packet, an egress queue occupancy, a clock state, or a steering engine used during egress of the data packet.

Additionally in accordance with an embodiment of the present disclosure, the system includes a data analyzer configured to receive a dataset including event data items having respective timestamps and respective confidence levels, reduce the dataset to remove ones of the event data items from the dataset having respective ones of the respective confidence levels which are lower than respective ones of the respective confidence levels of remaining ones of the event data items in the dataset, and analyze the reduced dataset.

Moreover, in accordance with an embodiment of the present disclosure, the system includes a data analyzer configured to receive a dataset including event data items having respective timestamps and respective confidence levels, select one of the event data items having a highest confidence level of the respective confidence levels, and analyze the selected event data item.

Further in accordance with an embodiment of the present disclosure, the system includes a data analyzer configured to receive a dataset including event data items having respective timestamps and respective confidence levels, identify at least one traffic pattern causing some event data items of the respective event data items to have respective ones of the respective confidence levels below a given confidence level, and issue a command to adjust the identified at least one traffic pattern.

Still further in accordance with an embodiment of the present disclosure, the system includes a transaction processing device configured to process requests from multiple requesting entities responsively to a timeout which is set responsively to the generated confidence level.

Additionally in accordance with an embodiment of the present disclosure, the system includes a first network node and a second network node, the first and second network nodes being connected directly by a cable, wherein the first network node includes first event processing circuitry configured to identify occurrence of the event, and generate the timestamp for the identified event responsively to the time value indicative of when a hardware operation associated with the event occurred, and the second network node includes second event processing circuitry configured to generate the confidence level indicative of the degree of confidence of the accuracy of the timestamp generated by the first network node responsively to a common traffic pattern between the first network node and the second network node.

Moreover, in accordance with an embodiment of the present disclosure the first network node is a master clock synchronization node, the second network node is a slave clock synchronization node, the master clock synchronization node is configured to send a clock synchronization message including the timestamp to the slave synchronization node, and the slave clock synchronization node is configured to perform a clock synchronization responsively to the received clock synchronization message.

Further in accordance with an embodiment of the present disclosure, the system includes dock synchronization circuitry configured to receive a plurality of clock synchronization messages including respective timestamps, the respective timestamps having associated confidence levels indicative of respective degrees of confidence of respective accuracy of the respective timestamps, select at least one of the respective timestamps responsively to respective ones of the associated confidence levels, and perform a clock synchronization responsively to the selected at least one of the respective timestamps.

Still further in accordance with an embodiment of the present disclosure the clock synchronization circuitry is configured to perform the dock synchronization responsively to the respective timestamps while applying a higher weight to the selected at least one of the respective timestamps.

Additionally, in accordance with an embodiment of the present disclosure, the system includes a master clock synchronization node and a slave clock synchronization node, which includes the clock synchronization circuitry, wherein the master clock synchronization node is configured to send the plurality of clock synchronization messages including respective timestamps and associated confidence levels to the slave clock synchronization node.

There is also provided in accordance with another embodiment of the present disclosure, an event processing method, including providing time values, and generating a confidence level indicative of a degree of confidence of an accuracy of a timestamp, the timestamp being generated for an event responsively to a time value indicative of when an operation associated with the event occurred.

Moreover, in accordance with an embodiment of the present disclosure, the method includes identifying occurrence of the event, and generating the timestamp for the identified event responsively to the time value indicative of when a hardware operation associated with the event occurred.

Further in accordance with an embodiment of the present disclosure, the method includes adding the timestamp and the confidence level to an event data item.

Still further in accordance with an embodiment of the present disclosure the event data item is a packet notification message.

Additionally, in accordance with an embodiment of the present disclosure the event data item is a clock synchronization message.

Moreover in accordance with an embodiment of the present disclosure the generating the confidence level is performed responsively to any one or more factors selected from a traffic pattern during occurrence of the event, a line speed during occurrence of the event, a bandwidth value during occurrence of the event, a steering engine used during occurrence of the event, hardware performing the hardware operation, a queue occupancy, a clock state, or a PHY protocol used to perform the hardware operation.

Further in accordance with an embodiment of the present disclosure, the method includes receiving a data packet over a packet data network, processing the received data packet, the event including the data packet being received at the time value, and adding the timestamp and the confidence level to the data packet.

Still further in accordance with an embodiment of the present disclosure the generating the confidence level is performed responsively to any one or more ingress factors selected from a location of the data packet in a packet processing pipeline when the timestamp was generated, a traffic pattern during ingress of the data packet, a line speed during ingress of the data packet, a bandwidth value during ingress of the data packet, an ingress queue occupancy, a clock state, or a steering engine used during occurrence of the event.

Additionally, in accordance with an embodiment of the present disclosure, the method includes sending a data packet over a packet data network, processing the data packet for sending over the packet data network, the event including the data packet being sent over the packet data network at the time value, and adding the timestamp and the confidence level to the data packet.

Moreover, in accordance with an embodiment of the present disclosure, the method includes storing the data packet in an egress buffer prior to sending the data packet over the packet data network, wherein the generating the confidence level is performed responsively to a buffer level of the egress buffer at the time value.

Further in accordance with an embodiment of the present disclosure the generating the confidence level is performed responsively to any one or more egress factors selected from a location of the data packet in a packet processing pipeline when the timestamp was generated, a traffic pattern during egress of the data packet, a line speed during egress of the data packet, a bandwidth value during egress of the data packet, an egress queue occupancy, a clock state, or a steering engine used during egress of the data packet.

Still further in accordance with an embodiment of the present disclosure, the method includes receiving a dataset including event data items having respective timestamps and respective confidence levels, reducing the dataset to remove ones of the event data items from the dataset having respective ones of the respective confidence levels which are lower than respective ones of the respective confidence levels of remaining ones of the event data items in the dataset, and analyzing the reduced dataset.

Additionally, in accordance with an embodiment of the present disclosure, the method includes receiving a dataset including event data items having respective timestamps and respective confidence levels, selecting one of the event data items having a highest confidence level of the respective confidence levels, and analyzing the selected event data item.

Moreover, in accordance with an embodiment of the present disclosure, the method includes receiving a dataset including event data items having respective timestamps and respective confidence levels, identifying at least one traffic pattern causing some event data items of the respective event data items to have respective ones of the respective confidence levels below a given confidence level, and issuing a command to adjust the identified at least one traffic pattern.

Further in accordance with an embodiment of the present disclosure, the method includes processing requests from multiple requesting entities responsively to a timeout which is set responsively to the generated confidence level.

Still further accordance with an embodiment of the present disclosure, the method includes identifying, in a first network node, occurrence of the event, generating, in the first network node, the timestamp for the identified event responsively to the time value indicative of when a hardware operation associated with the event occurred, and generating in a second network node connected directly by a cable to the first network node, the confidence level indicative of the degree of confidence of the accuracy of the timestamp generated by the first network node responsively to a common traffic pattern between the first network node and the second network node.

Additionally, in accordance with an embodiment of the present disclosure the first network node is a master clock synchronization node, the second network node is a slave clock synchronization node, and the method further including the master clock synchronization node sending a clock synchronization message including the timestamp to the slave synchronization node, and the slave synchronization node performing a clock synchronization responsively to the received clock synchronization message.

Moreover in accordance with an embodiment of the present disclosure, the method includes receiving a plurality of clock synchronization messages including respective timestamps, the respective timestamps having associated confidence levels indicative of respective degrees of confidence of respective accuracy of the respective timestamps, selecting at least one of the respective timestamps responsively to respective ones of the associated confidence levels, and performing a dock synchronization responsively to the selected at least one of the respective timestamps.

Further in accordance with an embodiment of the present disclosure performing the clock synchronization includes performing the clock synchronization responsively to the respective timestamps while applying a higher weight to the selected at least one of the respective timestamps.

Still further in accordance with an embodiment of the present disclosure, the method includes a master clock synchronization node sending the plurality of clock synchronization messages including respective timestamps and associated confidence levels to a slave clock synchronization node, wherein the clock synchronization is performed by the slave clock synchronization node.

BRIEF DESCRIPTION OF THE DRAWINGS

The present invention will be understood from the following detailed description, taken in conjunction with the drawings in which:

FIG. 2 is a flowchart including steps in method to process an event data item in the system of FIG. 1;

FIG. 3 is a flowchart including steps in a method to process ingress of a data packet in the system of FIG. 1;

DESCRIPTION OF EXAMPLE EMBODIMENTS

Overview

Figure 1:
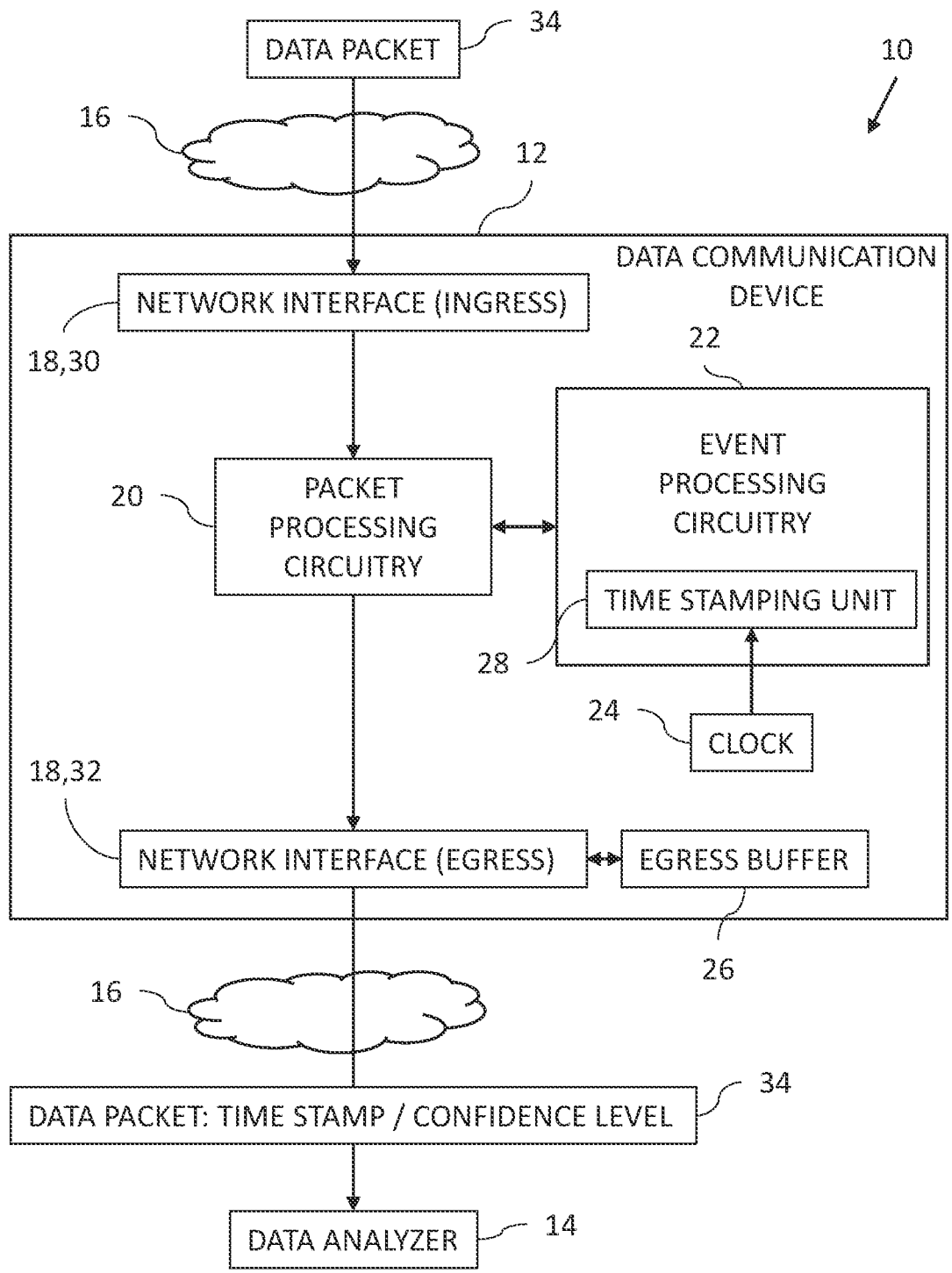
FIG. 1 is a partly pictorial, partly block diagram view of an event processing system constructed and operative in accordance with an embodiment of the present invention.

In hardware timestamping implementations, the time reported, $T_{reported}$, does not exactly match the time when the event happened, $T_{event}$. Rather, there is some difference $\Delta T$ between the two times such that: $T_{reported} = T_{event} + \Delta T$.

There are many sources of the time difference, $\Delta T$, relating to the specifics of the timestamping implementation and the state of the device (e.g., load and queue occupancy), and/or relating to the nature of the network pattern. The time difference is typically not measurable in a direct manner. In some cases, it may be estimated by inference from the observable device state parameters, such as queue occupancy.

Different hardware events may be sampled by different logic that have different accuracy. Some events may need an accuracy which is the same order of magnitude or greater than the measurement system itself.

Additionally, applications lack information to determine the relative magnitude of $\Delta T$, and through that the applications do not have the necessary information to assign more importance to certain timestamps and less importance to other timestamps, and potentially even disregarding them.

Embodiments of the present invention solve the above problems by generating a timestamp for an event (e.g., a data packet being received or sent, or a buffer overflowing, etc.) and a confidence level indicative of a degree of confidence of an accuracy of the generated timestamp. The timestamp and corresponding level of confidence may be added to an event data item, such as a data packet (e.g., clock synchronization message) or a log data item (e.g., packet completion notification message). In some embodiments, the timestamp may be added to one data structure (e.g., a data packet or any suitable data structure) and the confidence level added to another data structure. Additionally, or alternatively, the timestamp and/or confidence level may be sent to a processing unit (e.g., a local or remote CPU of an entity which generated the event data item) for processing. The timestamp may be indicative of a timing value when a hardware operation associated with the event occurred.

The confidence level typically does not have a measurement unit (e.g., in seconds). The confidence level is typically a relative metric in which the confidence level may be compared with another confidence level to determine which associated timestamp is deemed to be more accurate. For the sake of convenience, a confidence level with a higher value is deemed to be more accurate, and vice-versa. However, the confidence levels could be defined differently so that a confidence level with a lower value is deemed to be more accurate, in such a scheme, the highest confidence level from a dataset would have the lowest value, in some embodiments, between different hardware devices, or between different generations of hardware devices the confidence levels may need adjusting according to some scale or conversion factor in order to meaningfully compare different confidence levels.

The confidence level may be generated responsively to any factor or factors selected from: a traffic pattern during occurrence of the event; a line speed during occurrence of the event; a bandwidth value during occurrence of the event; a steering engine used during occurrence of the event; hardware performing the hardware operation; a queue occupancy; a clock state (e.g., whether the clock is locked or unlocked); or a PHY protocol used to perform the hardware operation.

The confidence level of an ingress timestamp (e.g., for a data packet) may depend on one or more factors, for example, any one or more of the following factors: a location of the data packet in a packet processing pipeline when the ingress timestamp was generated (e.g., in PHY layer, MAC layer, core/buffer layer, or software layer); a traffic pattern during ingress of the data packet; a line speed during ingress of the data packet; a bandwidth value during ingress of the data packet; an ingress queue occupancy; a clock state (e.g., whether the clock is locked or unlocked); or a steering engine used during ingress of the data packet.

The confidence level of an egress timestamp (e.g., for a data packet) may depend on one or more factors, for example, a buffer level of an egress buffer in which the data packet is stored at the time the egress time stamp is assigned.

The confidence level of an egress timestamp (e.g., for a data packet) may depend on one or more factors, for example, any one or more of the following factors: a location of the data packet in a packet processing pipeline when the egress timestamp was generated (e.g., in PEW layer, MAC layer, core/buffer layer, or software layer); a traffic pattern during egress of the data packet; a line speed during egress of the data packet; a bandwidth value during egress of the data packet; an egress queue occupancy; a clock state (e.g., whether the clock is locked or unlocked); or a steering engine used during egress of the data packet.

Providing a confidence level for each timestamp may enable applications to process the timestamp data according to the confidence levels associated with timestamps. For example, for recurring events of the same type, an application may select the timestamp with the highest confidence level, or 30% of the timestamps with the highest confidence levels, or timestamps with confidence levels above a given confidence level. By way of another example, a traffic pattern or patterns associated with timestamps having lower confidence levels may be identified so that the traffic pattern(s) may be avoided in the future.

By way of another example, clock synchronization messages having higher confidence levels may be identified so that clock synchronization may be performed based on the timestamps with higher confidence.

A transaction processing device may process requests from different entities according to the time that requests are issued by the requesting entities. Therefore, the transaction processing device may wait for a given timeout before processing requests to ensure that requests are processed according to the time the requests were issued. In some embodiments, the transaction processing device may adjust the timeout according to the confidence levels associated with the timestamps of the received requests. For example, if the confidence level is high (e.g., above a given level) then the timeout may be reduced and/or if the confidence level is low (e.g., below a given level) then the timeout may be increased.

In some embodiments, two immediate link partners (e.g., two network nodes directly connected via a cable without intervening nodes) may implement confidence levels even if one of the link partners does not include circuitry or software to generate confidence levels. The immediate link partners share the same traffic pattern between them as they are subject to the same bandwidth fluctuation, load, and link speed as they share the same cable. If a first one of the immediate link partners sends an event data item including an egress timestamp to a second one of the immediate link partners, the second immediate link partner may generate the confidence level of the egress timestamp (which was generated by the first immediate link partner) based on the known traffic pattern between the immediate link partners. The above may be useful in many scenarios including clock synchronization. For example, a master clock synchronization node may send clock synchronization messages to a slave clock synchronization node. If the master clock synchronization node does not have the capability to generate confidence levels, the slave clock synchronization node may generate the confidence levels for the timestamps of the received clock synchronization messages. The slave clock synchronization node may then select the clock synchronization messages with the highest confidence levels for use in clock synchronization.

SYSTEM DESCRIPTION

Reference is now made to FIG. 1, which is a partly pictorial, partly block diagram view of an event processing system 10 constructed and operative in accordance with an embodiment of the present invention.

The event processing system 10 includes data communication device 12. The data communication device 12 shown in FIG. 1 is a network switch. In some embodiments, the data communication device 12 may be a router or network interface controller (MC) or any suitable network device or other processing device which timestamps events occurring in that device.

The event processing system 10 also includes a data analyzer 14. The data analyzer 14 is described in more detail below with reference to FIGS. 5-7. The data analyzer 14 may be disposed in the data communication device 12 or in another processing device in the event processing system 10. FIG. 1 shows the data analyzer 14 and the data communication device 12 connected via a packet data network 16. The packet data network 16 may include any suitable network, e.g., a wired network, a wireless network, and/or an optically switched network.

The data communication device 12 includes a network interface 18, packet processing circuitry 20, event processing circuitry 22, a clock 24, and an egress buffer 26. The event processing circuitry 22 may also include a time stamping unit 28.

The network interface 18 is shown in FIG. 1 including two sections, an ingress interface 30 and an egress interface 32. The ingress interface 30 and egress interface 32 are shown separately for the sake of simplicity. However, in practice any port of the network interface 18 may selectively function as an egress port or an ingress port. The network interface 18 may comprise a single unit or multiple units. The network interface 18 is configured to receive data packets from the packet data network 16 and send data packets over the packet data network 16. The egress buffer 26 is configured to store data packets (enqueued for egress) prior to sending the data packets over the packet data network 16.

The packet processing circuitry 20 is configured to process received packets from the packet data network 16 and process packets for sending over the packet data network 16. The packet processing circuitry 20 may include any suitable hardware and/or software, for example, one or more PHY chips, and one or more MAC chips.

The event processing circuitry 22 is configured to identify events (e.g., receiving a packet, sending a packet, a logger event such as buffer overflow etc.) and generate timestamps and corresponding confidence levels for the identified events, as described in more detail with reference to FIGS. 2-4. The clock 24 is configured to provide time values. The time stamping unit 28 unit may be configured to generate the timestamps responsively to the time values provided by the clock 24.

In practice, some or all of the functions of the event processing circuitry 22 may be combined in a single physical component or, alternatively, implemented using multiple physical components. These physical components may comprise hard-wired or programmable devices, or a combination of the two. In some embodiments, at least some of the functions of the event processing circuitry 22 may be carried out by a programmable processor under the control of suitable software. This software may be downloaded to a device in electronic form, over a network, for example. Alternatively, or additionally, the software may be stored in tangible, non-transitory computer-readable storage media, such as optical; magnetic, or electronic memory.

Providing a confidence level for each timestamp may enable the data analyzer 14 (e.g., an application running on the data analyzer 14) to process the timestamp data according to the confidence levels associated with timestamps. For example, the application may select the timestamp with the highest confidence level or 30% of the timestamps with the highest confidence levels or timestamps with confidence levels above a given confidence level, as described in more detail with reference to FIGS. 5 and 6. By way of another example, a traffic pattern or patterns associated with timestamps having lower confidence levels may be identified so that the identified traffic pattern(s) may be avoided in the future, as described in more detail with reference to FIG. 7.

Reference is now made to FIG. 2, which is a flowchart 200 including steps in method to process an event data item (e.g., a data packet 34 (FIG. 1)) in the system 10 of FIG. 1. Reference is also made to FIG. 1. The event processing circuitry 22 is configured to identify (block 202) occurrence of an event, such as receipt of the data packet 34 or sending of the data packet 34, or overflow of a buffer or any other suitable event. The time stamping unit 28 of the event processing circuitry 22 is configured to generate (block 204) a timestamp for the identified event responsively to a time value (provided by the clock 24) indicative of when a hardware operation associated with the event occurred. The time stamping unit 28 is configured to generate (block 206) a confidence level indicative of a degree of confidence of an accuracy of the generated timestamp. The event processing circuitry is configured to generate the confidence level responsively to any one or more factors selected from: a traffic pattern during occurrence of the event; a line speed during occurrence of the event; a bandwidth value during occurrence of the event; a steering engine used during occurrence of the event; hardware performing the hardware operation; a queue occupancy; a clock state (e.g., whether the clock is locked or unlocked); or a PRY protocol (e.g., 10 G or 25 G) used to perform the hardware operation. For example, if hardware performing timestamping is accurate to about 1 millisecond, timestamps generated by the hardware may be assigned a given confidence level. If the accuracy of the hardware improves to about 1 microsecond, then timestamps generated by the improved hardware may be assigned a higher confidence level.

The event processing circuitry 22 is configured to add (block 208) the generated timestamp and confidence level to an event data item (e.g., the data packet 34 shown at the bottom section of FIG. 1 includes a timestamp and corresponding confidence level). In some embodiments, the event data item may include a clock synchronization message described in more detail below with reference to FIGS. 12, 13, 15, and 16. In some embodiments, the event data item may include a packet completion notification message which refers to the data packet 34 and is sent after the data packet 34.

As previously mentioned, in hardware timestamping implementations, the time reported, $T_{reported}$, does not exactly match the time when the event happened, $T_{event}$. Rather, there is some difference $\Delta T$ between the two times such that: $T_{reported} = T_{event} + \Delta T$. The confidence level typically does not have a measurement unit (e.g., in seconds). The confidence levels may or may not have a linear relationship to $\Delta T$. The confidence level is typically a relative metric in which the confidence level may be compared with another confidence level to determine which associated timestamp is deemed to be more accurate. So, for example, two timestamps T1 and T2 have respective corresponding confidence levels C1 and C2. If C1 is greater than C2 it may be assumed that $\Delta T$ for timestamp T1 is smaller than $\Delta T$ for timestamp T2.

For the sake of convenience, a confidence level with a higher value is deemed to be more accurate, and vice-versa. For example, a confidence level may be an 8-bit unsigned integer with 0 corresponding to the lowest confidence level and 255 corresponding to the highest confidence level. However, the confidence levels could be defined differently so that a confidence level with a lower value is deemed to be more accurate. In such a scheme, the highest confidence level from a dataset would have the lowest value.

Confidence levels may be event-type dependent such that a confidence level generated for one event type may not be comparable to a confidence level for another event type. For example, confidence levels for packet ingress timestamps may or may not be comparable with confidence levels for egress timestamps. Similarly, confidence levels for packet ingress/egress timestamps may not be comparable to logger event timestamps (e.g., when a buffer overflowed).

Reference is now made to FIG. 3, which is a flowchart 300 including steps in a method to process ingress of the data packet 34 in the system 10 of FIG. 1. Reference is also made to FIG. 1.

The ingress interface 30 of the network interface 18 is configured to receive (block 302) the data packet 34 over the packet data network 16. The packet processing circuitry 20 is configured to process (block 304) the received data packet 34. The time stamping unit 28 of the event processing circuitry 22 is configured to generate (block 306) an ingress timestamp for the data packet 34 responsively to a time value provided by the clock 24. The data packet 34 being received by the packet processing circuitry 22 is an event which occurs at the time value given by the clock 21. The event processing circuitry 22 is configured to generate (block 308) a confidence level for the generated ingress timestamp.

In some embodiments, the event processing circuitry 22 is configured to generate the confidence level responsively to a location of the data packet 34 in a packet processing pipeline when the ingress timestamp was generated. For example, the ingress timestamp may be generated when the data packet 34 is in a PHY layer, in a MAC layer, in a core/buffer layer, or in a software layer. A timestamp assigned in the PHY layer may have a higher confidence level than a timestamp assigned in the MAC layer. A timestamp assigned in the MAC layer may have a higher confidence level than a timestamp assigned in the core/buffer layer. A timestamp assigned in the core/buffer layer may have a higher confidence level than a timestamp assigned in the software layer.

In some embodiments, the event processing circuitry 22 is configured to generate the confidence level of the ingress timestamp responsively to any one or more ingress factors selected from: a traffic pattern during ingress of the data packet 34; a line speed during ingress of the data packet 34; a bandwidth value during ingress of the data packet 34; an ingress queue occupancy; a clock state (e.g., whether the clock is locked or unlocked); or a steering engine used during ingress of the data packet 34. For example, a timestamp assigned during dynamically fluctuating incoming traffic may have a lower confidence level than a packet arriving during constant or low bandwidth traffic.

The event processing circuitry 22 is configured to add (block 310) the timestamp and the confidence level to the data packet 34.

In some embodiments, the ingress timestamp and corresponding confidence level may be added to any suitable data structure in addition to, or instead of being added to the data packet 34. In some embodiments, the ingress timestamp is added to the data packet 34 and the corresponding confidence level is added to another data structure or vice-versa. Additionally, or alternatively, the ingress timestamp and/or confidence level may be sent to a processing unit (e.g., a local CPU such as a CPU of the data communication device 12 or a remote CPU of an entity which generated the data packet 34) for processing.

Figure 4:
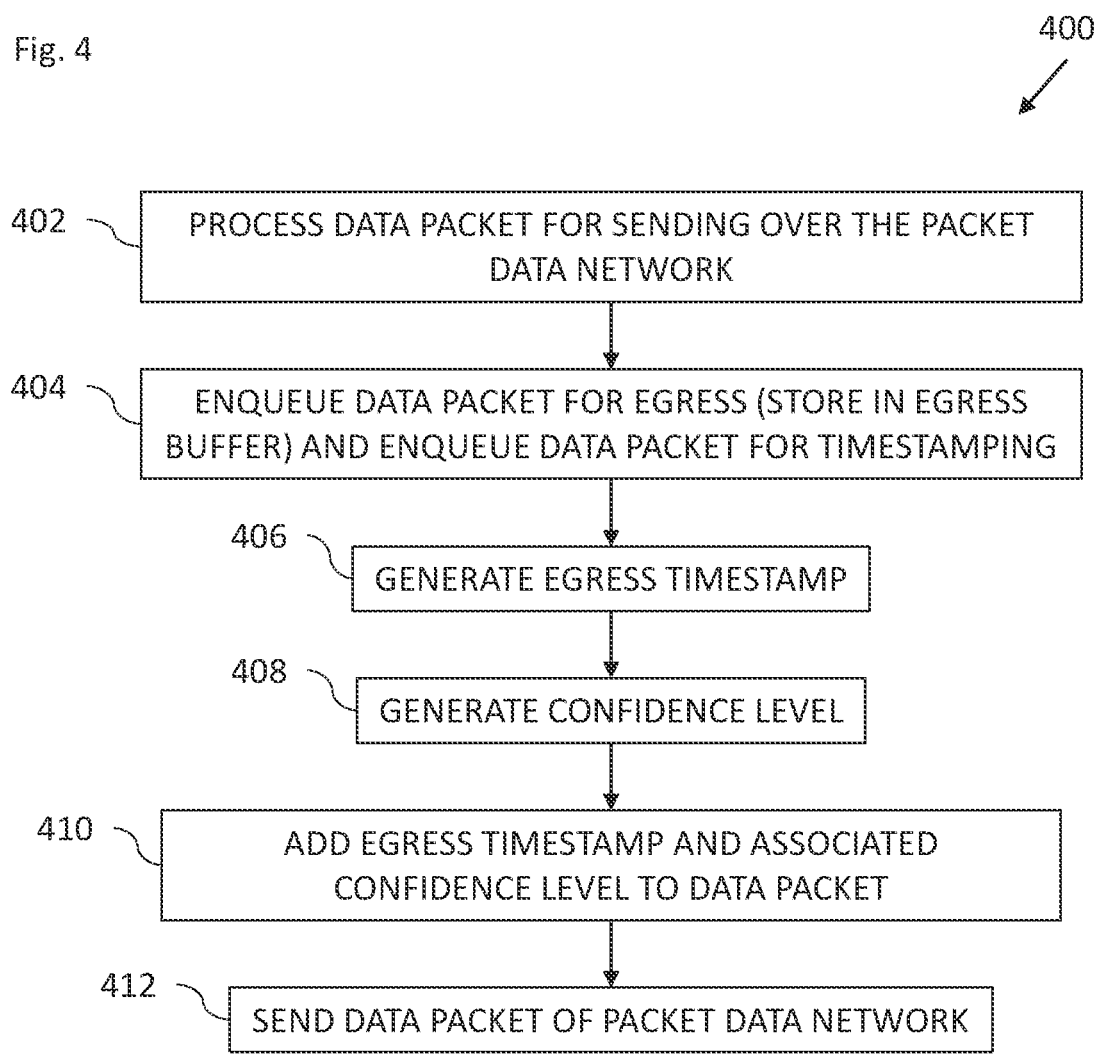
FIG. 4 is a flowchart including steps in a method to process egress of a data packet in the system of FIG. 1.

Reference is now made to FIG. 4, which is a flowchart 400 including steps in a method to process egress of the data packet 34 in the system 10 of FIG. 1.

The packet processing circuitry 20 is configured to process (block 402) the data packet 46 (e.g., in an SX pipe block) for sending via the egress interface 32 of the network interface 18 over the packet data network 16. The packet processing circuitry 20 is configured to enqueue (block 404) the data packet 34 for egress and enqueue the data packet 34 for timestamping at substantially the same time. The egress buffer 26 is configured to store the data packet 34 prior to sending the data packet 34 over the packet data network 16.

The time stamping unit 28 of the event processing circuitry 22 is configured to generate (block 406) an egress timestamp for the enqueued data packet 34 responsively to a time value provided by the clock 24. The data packet 36 being sent over the packet data network 16 is an event which occurs at the time value given by the clock 24.

The delay between the data packet 34 exiting the data communication device 12 and the timestamp being generated may be variable and impacts the relevance of the reported timestamp. The confidence level may be generated responsively to the hardware implementation as well as dynamic device state parameters such as queue occupancy, hardware parameters, installed firmware or device driver type. In some embodiments, the event processing circuitry 22 is configured to generate (block 408) a confidence level responsively to a buffer level of the egress buffer at the time (i.e., time value) when value egress timestamp was generated.

In some embodiments, the event processing circuitry 22 is configured to generate the confidence level of the egress timestamp responsively to any one or more egress factors selected from: a location of the data packet 34 in a packet processing pipeline when the egress timestamp was generated; a traffic pattern during egress of the data packet 34; a line speed during egress of the data packet 34; a bandwidth value during egress of the data packet 34; an egress queue occupancy; a clock state (e.g., whether the clock is locked or unlocked); or a steering engine used during egress of the data packet 34.

The event processing circuitry 22 is configured to add (block 410) the egress timestamp and the corresponding confidence level to the data packet 34. In some embodiments, the egress timestamp and corresponding confidence level may be added to any suitable data structure in addition to, or instead of being added to the data packet 34. In some embodiments, the egress timestamp is added to the data packet 34 and the corresponding confidence level is added to another data structure or vice-versa. Additionally, or alternatively, the egress timestamp and/or confidence level may be sent to a processing unit (e.g., a local CPU such as a CPU of the data communication device 12 or a remote CPU of an entity which generated the data packet 34) for processing.

The egress interface 32 of the network interface 18 is configured to send (block 412) the data packet 34 over the packet data network 16.

Figure 5:
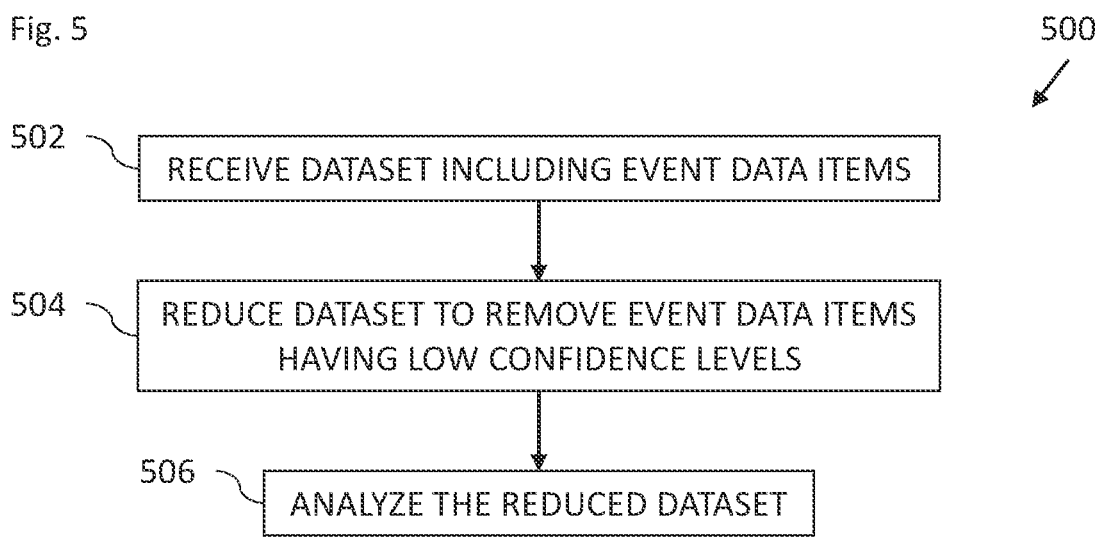
FIG. 5 is a flowchart including steps in a method to reduce a dataset and analyze the reduced dataset in the system of FIG. 1.

Reference is now made to FIG. 5, which is a flowchart 500 including steps in a method to reduce a dataset and analyze the reduced dataset in the system 10 of FIG. 1. Reference is also made to FIG. 1. To improve accuracy, the event processing system 10 may over sample and the data analyzer 14 remove outliers from the sampling. Using confidence levels provides an effective way to remove outliers by removing outliers having lower confidence levels associated with the timestamps of the outliers. For example, if the data analyzer 14 is configured to discard 30% of the samples, then the data analyzer 14 may be configured to remove 30% of event data items with the lowest confidence level (e.g., by event type).

Therefore, in some embodiments, the data analyzer 14 is configured to: receive (block 502) a dataset including event data items having respective timestamps and respective confidence levels; reduce (block 504) the dataset to remove event data items (e.g., a certain percentage of event data items) from the dataset having respective confidence levels which are lower than the respective confidence levels of the event data items remaining in the dataset; and analyze the reduced dataset.

Figure 6:
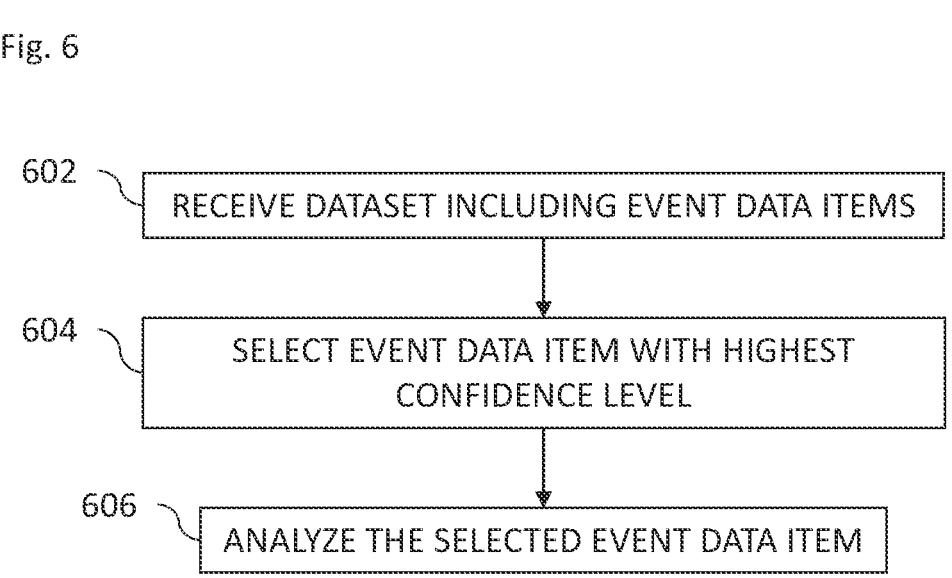
FIG. 6 is a flowchart including steps in a method to select and analyze an event data item in the system of FIG. 1.

Reference is now made to FIG. 6, which is a flowchart 600 including steps in a method to select and analyze an event data item in the system 10 of FIG. 1. Reference is also made to FIG. 1. To improve accuracy, the event processing system 10 may sample many events and only one of the event data items may be selected by the data analyzer 14 for analysis. Using confidence levels provides an effective way to select the event data item. Therefore, in some embodiments the data analyzer 14 is configured to: receive (block 602) a dataset including event data items having respective timestamps and respective confidence levels; select (block 604) one of the event data items having the highest confidence level of the respective confidence levels and analyze (block 606) the selected event data item.

Figure 7:
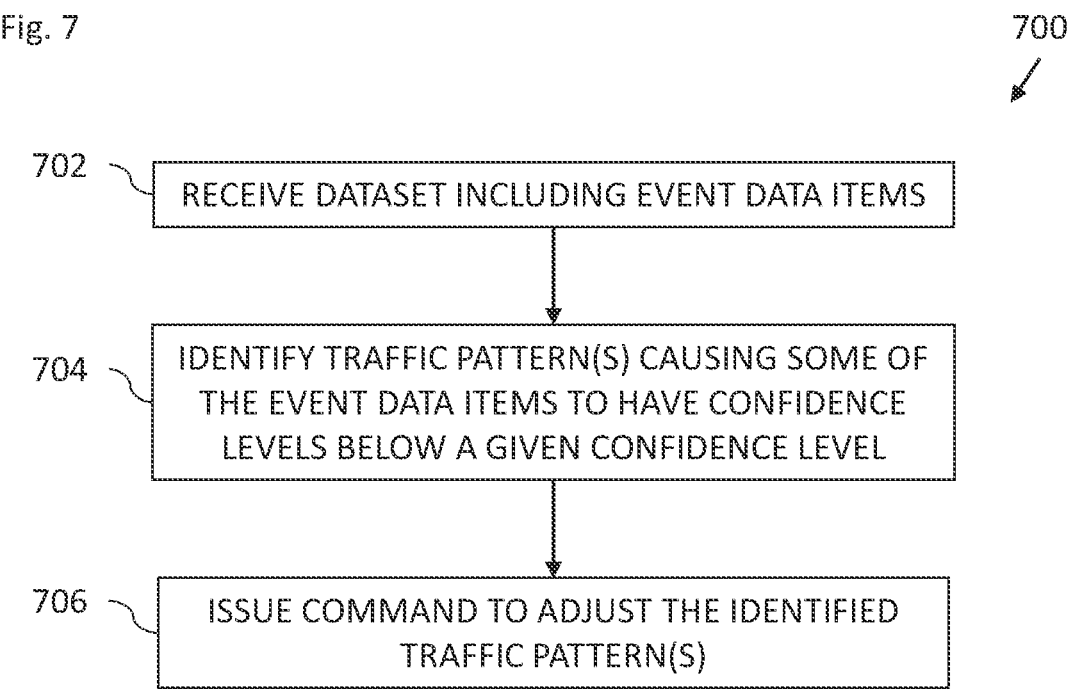
FIG. 7 is a flowchart including steps in a method to identify and adjust a traffic pattern in the system of FIG. 1.

Reference is now made to FIG. 7, which is a flowchart 700 including steps in a method to identify and adjust a traffic pattern in the system 10 of FIG. 1.

Figure 8:
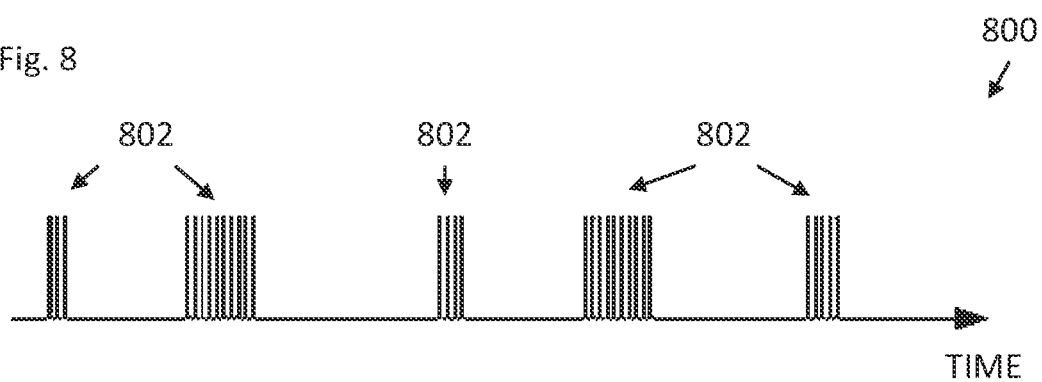
FIG. 8 is a schematic view of a bursty traffic pattern.
Figure 9:
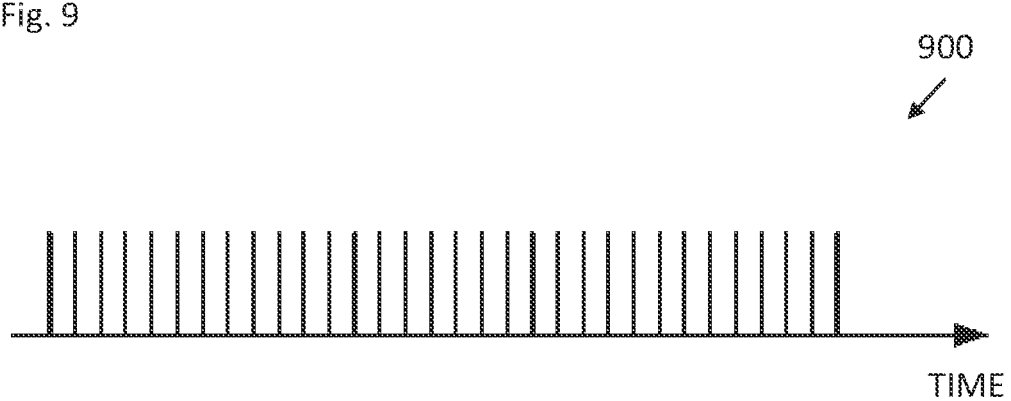
FIG. 9 is a schematic view of a paced traffic pattern.

The data analyzer 14 may identify what is causing a low confidence level. For example, the data analyzer 14 may identify that a particular traffic pattern is causing low confidence levels for generated timestamps and may therefore adjust the traffic pattern. An example of a traffic pattern that may be associated with low confidence levels is shown in FIG. 8. FIG. 8 shows low bandwidth bursty traffic 800. Each vertical line in FIG. 8 represents a packet being processed. The traffic 800 may have an average traffic bandwidth that is low compared to the link-speed, but the packets are grouped together in bursts 802, with the bursts 802 being separated by idle periods. Therefore, in some embodiments, the data analyzer 14 is configured to: receive (block 702) a dataset including event data items (e.g., data packets) having respective timestamps and respective confidence levels; identify (block 704) at least one traffic pattern (e.g., the traffic 800) causing some of the event data items to have respective confidence levels below a given confidence level; and issue (block 706) a command to adjust the identified traffic pattern(s). An example of an adjusted traffic pattern 900 is shown in FIG. 9. FIG. 9 shows that the packets (vertical lines in FIG. 9) are spread out substantially evenly over time. The adjusted traffic pattern 900 may be implemented using pacing within the data communication device 12 to pace the rate of sending of packets over the packet data network 16.

In practice, some or all of the functions of the data analyzer 14 may be combined in a single physical component or, alternatively, implemented using multiple physical components. These physical components may comprise hard-wired or programmable devices, or a combination of the two. In some embodiments, at least some of the functions of the data analyzer 14 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 10:
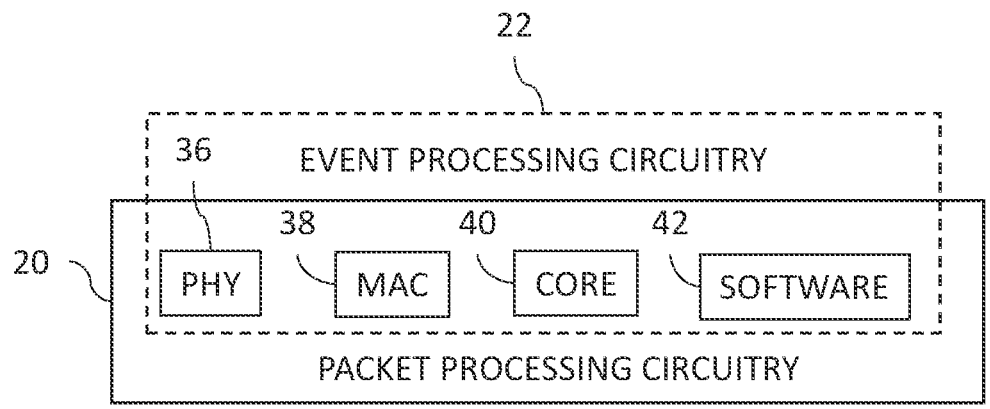
FIG. 10 is schematic view of event processing circuitry and packet processing circuitry in the system of FIG. 1.

Reference is now made to FIG. 10, which is schematic view of event processing circuitry 22 and packet processing circuitry 20 in the system 10 of FIG. 1. As previously mentioned, timestamps may be generated at different locations in the packet processing circuitry 20 or the packet processing pipeline. The packet processing circuitry 20 may include a PHY 36, MAC 38, core 40, or software section 42 in which timestamps are generated. Corresponding to the different sections 36-42 of the packet processing circuitry 20 in which timestamps may be generated, the event processing circuitry 22 includes corresponding circuitry to generate the respective confidence levels of the timestamps. For example, the event processing circuitry 22 may include circuitry in any one or more of the following: the PHY 36, MAC 38, core 40, and/or software section 42.

Figure 11:
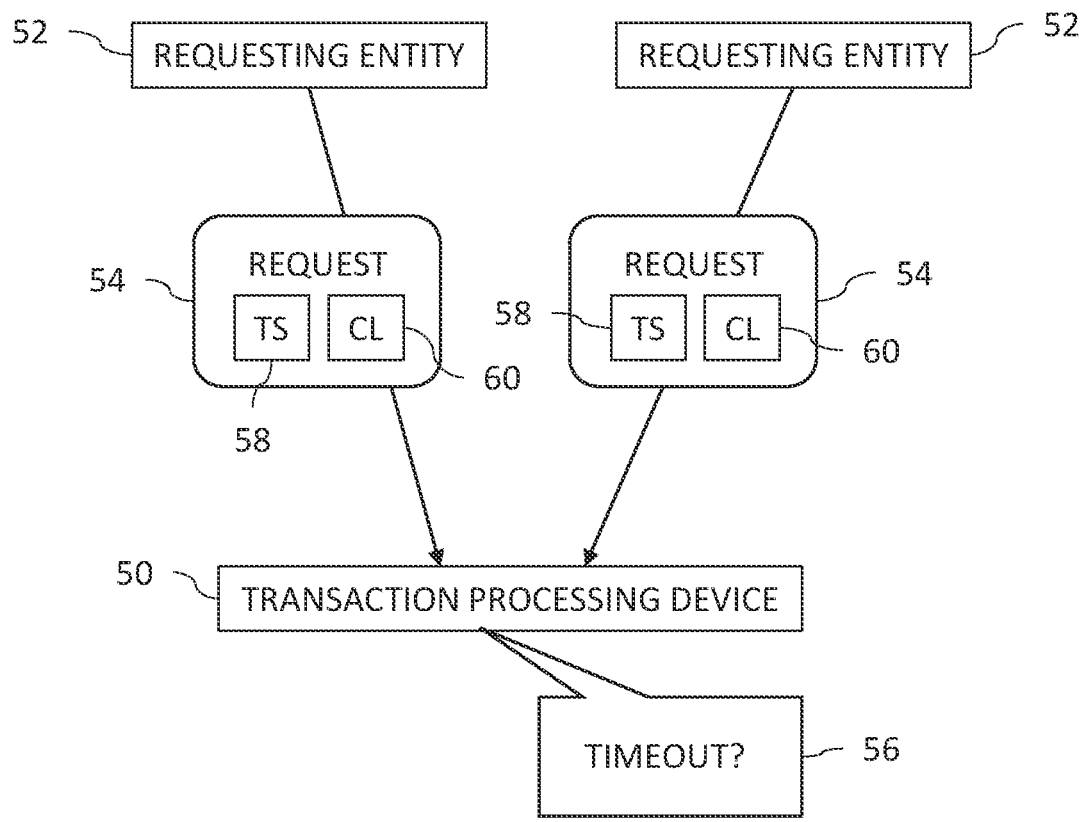
FIG. 11 is a schematic view of transaction processing in accordance with an embodiment of the present invention.

Reference is now made to FIG. 11, which is a schematic view of transaction processing in accordance with an embodiment of the present invention.

A transaction processing device 50 may process requests 54 from different requesting entities 52 according to the time at which requests 54 are issued by the requesting entities 52. Therefore, the transaction processing device 50 may wait for a given timeout 56 before processing the requests 54 to ensure that the requests 54 are processed according to the time the requests 54 were issued.

In some embodiments, each request 54 includes a respective timestamp 58 and confidence level 60. The transaction processing device 50 may adjust the timeout 56 according to the confidence levels 60 associated with the timestamps 58 of the received requests 54. For example, if the confidence level 60 is high (e.g., above a given level) then the timeout 56 may be reduced and/or if the confidence level 60 is low (e.g., below a given level) then the timeout 56 may be increased. The transaction processing device 50 is configured to process the requests 54 from the multiple requesting entities 52 responsively to the timeout 56 which is set responsively to the generated confidence levels 60.

Figure 12:
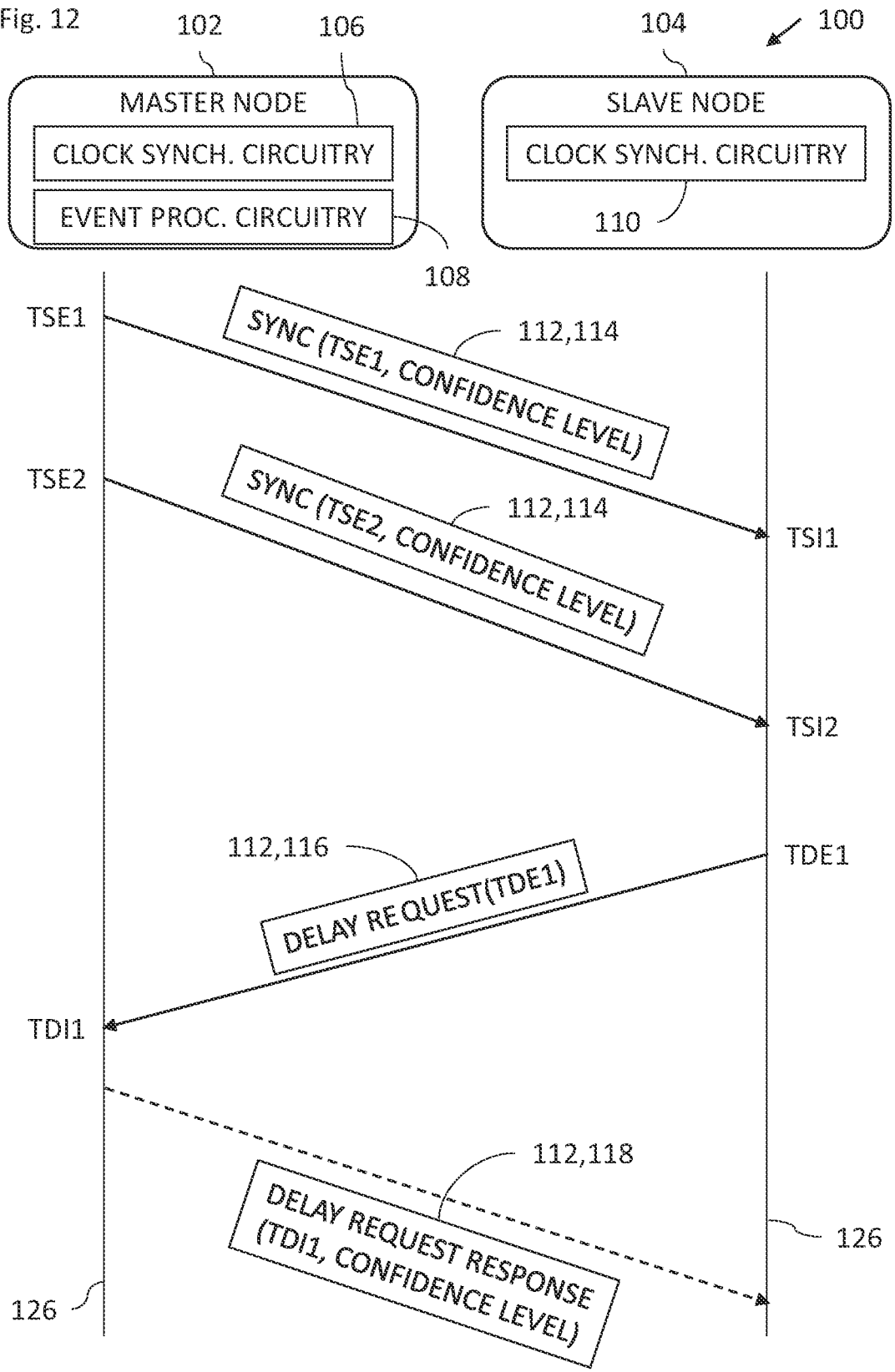
FIG. 12 is a schematic view of a clock synchronization system in accordance with an embodiment of the present invention.
Figure 13:
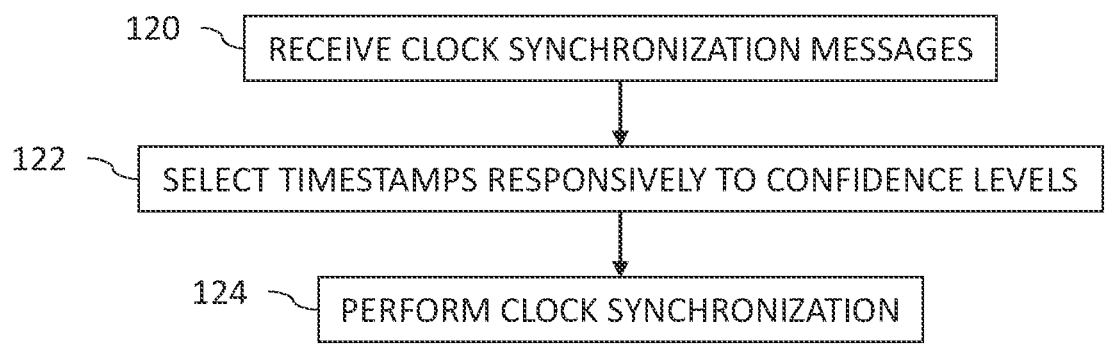
FIG. 13 is a flowchart including steps in a method of operation of the clock synchronization system of FIG. 12.

Reference is now made to FIGS. 12 and 13. FIG. 12 is a schematic view of a clock synchronization system 100 in accordance with an embodiment of the present invention.

FIG. 13 is a flowchart including steps in a method of operation of the clock synchronization system 100 of FIG. 12. Confidence levels may be used with clock synchronization messages so that clock synchronization messages having higher confidence levels may be identified so that clock synchronization may be performed based on timestamps with higher confidence and thereby perform a more accurate clock synchronization. Confidence levels may be used with any suitable clock synchronization protocol, for example, but not limited to, Precision Time Protocol (PTP), which is a protocol used to synchronize clocks throughout a computer network. The term "clock synchronization message", as used in the specification and claims, is defined herein as any message transferred between two network nodes for use in clock synchronization. Example clock synchronization messages in PIP include: Sync, Follow_Up, Delay_Eeq and Delay_Resp.

The clock synchronization system 100 includes a master clock synchronization node 102 and a slave clock synchronization node 104. The master clock synchronization node 102 includes clock synchronization circuitry 106 and event processing circuitry 108, which is configured to identify occurrence of events, generate timestamps and corresponding confidence levels. The slave clock synchronization node 104 includes clock synchronization circuitry 110. The slave clock synchronization node 104 shown in FIG. 12 does not include event processing circuitry. In some embodiments, the slave clock synchronization node 104 may include event processing circuitry to generate confidence levels for corresponding timestamps.

The master clock synchronization node 102 is configured to send clock synchronization messages 112 including respective timestamps and associated confidence levels to the slave clock synchronization node 104. FIG. 12 includes lines 126. The left line 126 represents the master clock synchronization node 102 and the right line 126 represents the slave clock synchronization node 104. The lines 126 also represent timelines of when messages are sent and received by the master clock synchronization node 102 and the slave clock synchronization node 104 with time increasing in the downward direction.

FIG. 12 shows the master clock synchronization node 102 sending Sync messages 114 with egress timestamps TSE1 and TSE2, which are received by the slave clock synchronization node 104 and assigned ingress timestamps TSI1 and TSI2, respectively. FIG. 12 shows the slave clock synchronization node 104 sending a delay request message 116 with an egress timestamp TDE1, which is received by the master clock synchronization node 102 and assigned an ingress timestamp TDI1 by the master clock synchronization node 102. In response, the master clock synchronization node 102 sends a delay request response 118 including the timestamp TDI1 and a corresponding confidence level of the timestamp TDI1.

The clock synchronization circuitry 110 is configured to receive (block 120) clock synchronization messages including respective timestamps (and confidence levels). The respective timestamps have associated confidence levels indicative of respective degrees of confidence of respective accuracy of the respective timestamps. The clock synchronization circuitry 110 is configured to select (block 122) at least one of the respective timestamps responsively to respective ones of the associated confidence levels. For example, the clock synchronization circuitry 110 selects the timestamps associated with the highest confidence levels or with confidence levels above a given value. The clock synchronization circuitry 110 is configured to perform (block 124) clock synchronization responsively to the selected timestamp(s).

In some embodiments, the clock synchronization circuitry 110 is configured to perform the clock synchronization responsively to (some or all of) the received respective timestamps while applying a higher weight to the selected timestamp(s).

In some embodiments, the clock synchronization circuitry 110 is configured to perform the clock synchronization responsively to the received respective timestamps while applying a weighting to (some or all of) the received timestamps according to the respective confidence levels of (some or all of) the received timestamps.

Figure 14:
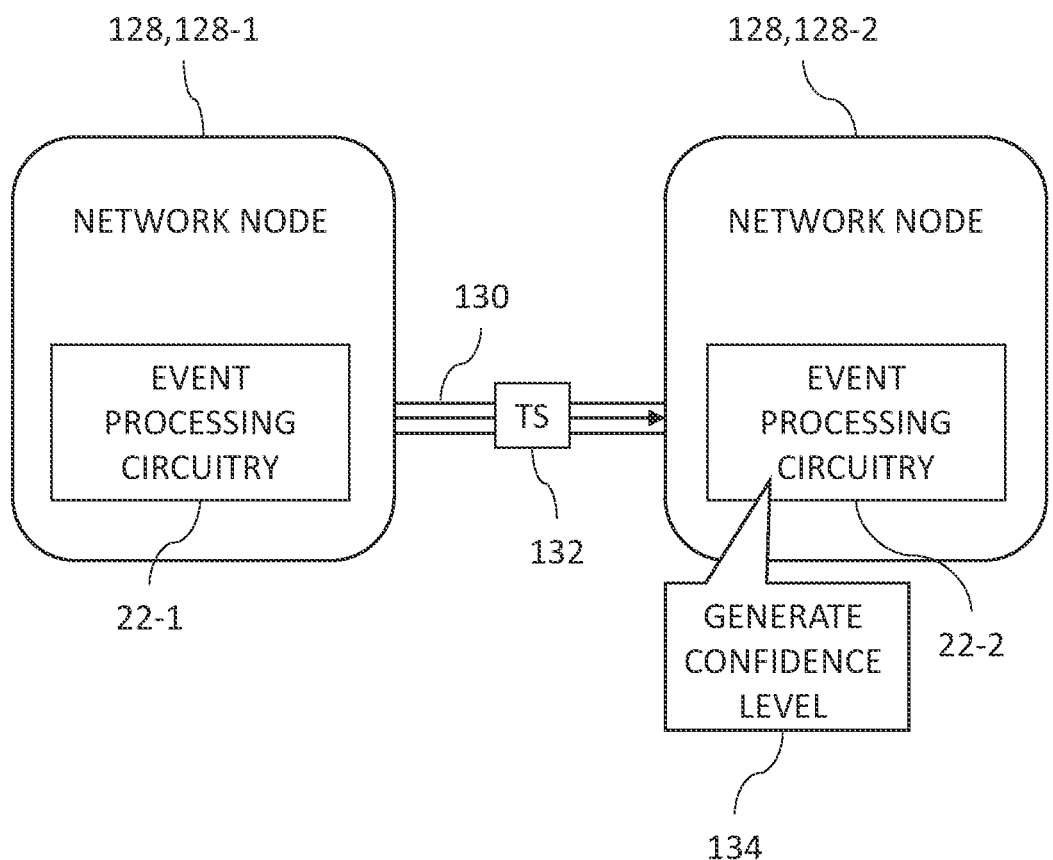
FIG. 14 is a schematic view of immediate link partner nodes in accordance with an embodiment of the present invention.

Reference is now made to FIG. 14, which is a schematic view of immediate link partner nodes 128 (including nodes 128-1 and 128-2) in accordance with an embodiment of the present invention. In some embodiments, immediate link partner nodes 128 (e.g., two network nodes directly connected via a cable 130 without intervening nodes) may implement confidence levels even if one of the link partner nodes 128 does not include circuitry or software to generate confidence levels. The immediate link partner nodes 128 share the same traffic pattern between them as they are subject to the same bandwidth fluctuation, load, and link speed as they share the same cable 130. If link partner node 128-1 sends an event data item including an egress timestamp 132 to link partner node 128-2, link partner node 128-2 may generate the confidence level (block 134) of the egress timestamp 132 (which was generated by the link partner node 128-1) based on the known traffic pattern between the immediate link partner nodes 128. Additionally, or alternatively, link partner node 128-2 may generate the confidence level of its own ingress timestamps including the ingress timestamp of the event data item when received from link partner node 128-2.

The node 128-1 comprises event processing circuitry 22-1 configured to identify occurrence of an event and generate the timestamp 132 for the identified event responsively to a time value indicative of when a hardware operation associated with the event occurred. The node 128-2 comprises event processing circuitry 22-2 configured to generate the confidence level indicative of the degree of confidence of the accuracy of the timestamp 132, which was generated by the node 128-1, responsively to a common traffic pattern between node 128-1 and node 128-2.

The above may be useful in many scenarios including clock synchronization. For example, a master clock synchronization node may send clock synchronization messages to a slave clock synchronization node. If the master clock synchronization node does not have the capability to generate confidence levels, the slave clock synchronization node may generate the confidence levels for the egress timestamps (generated by the master clock synchronization node) and the ingress timestamps (generated by the slave clock synchronization node on receipt of the clock synchronization messages from the master clock synchronization node) of the received clock synchronization messages, as described in more detail with reference to FIGS. 15 and 16.

Figure 15:
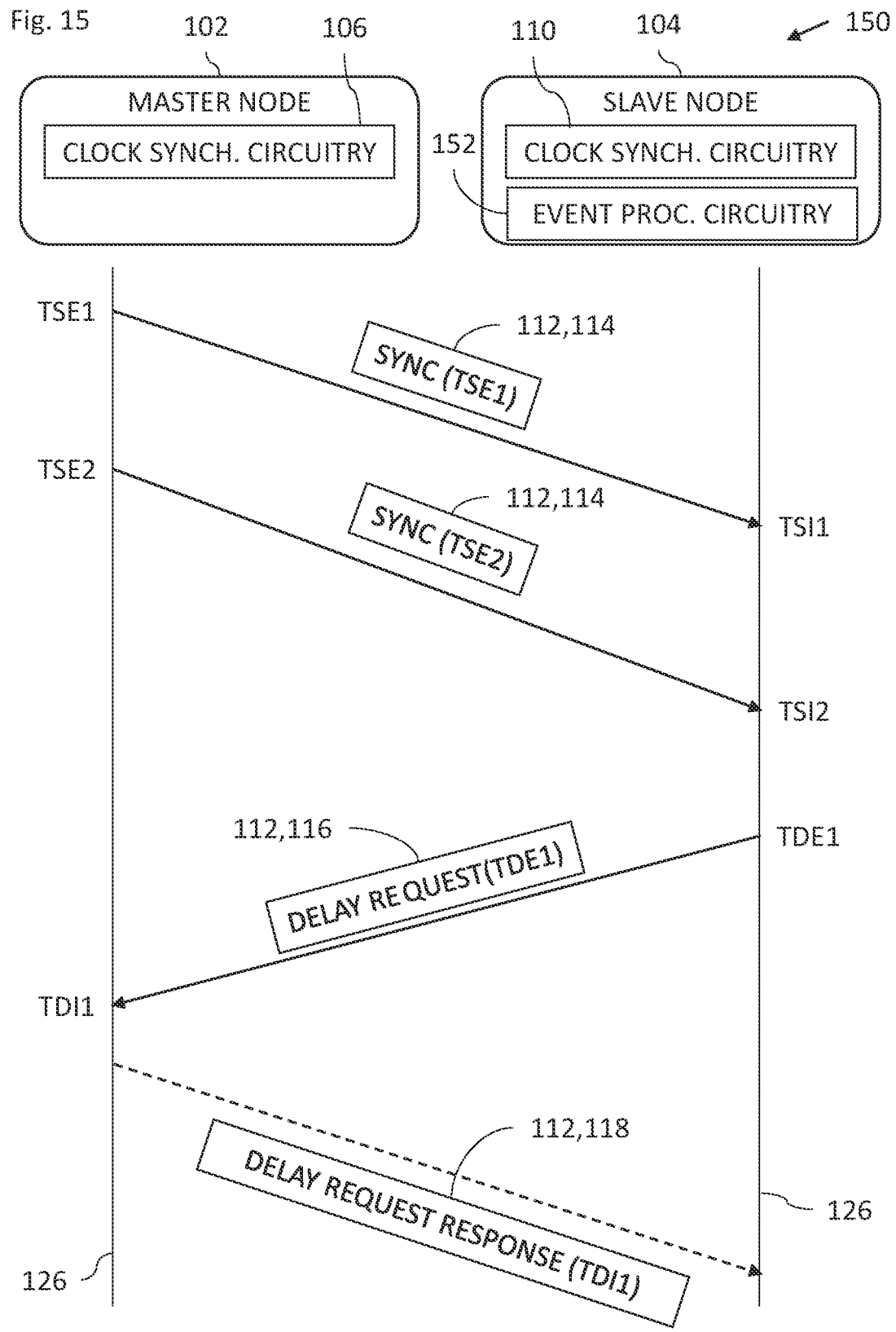
FIG. 15 is a schematic view of a clock synchronization system in accordance with an alternative embodiment of the present invention.
Figure 16:
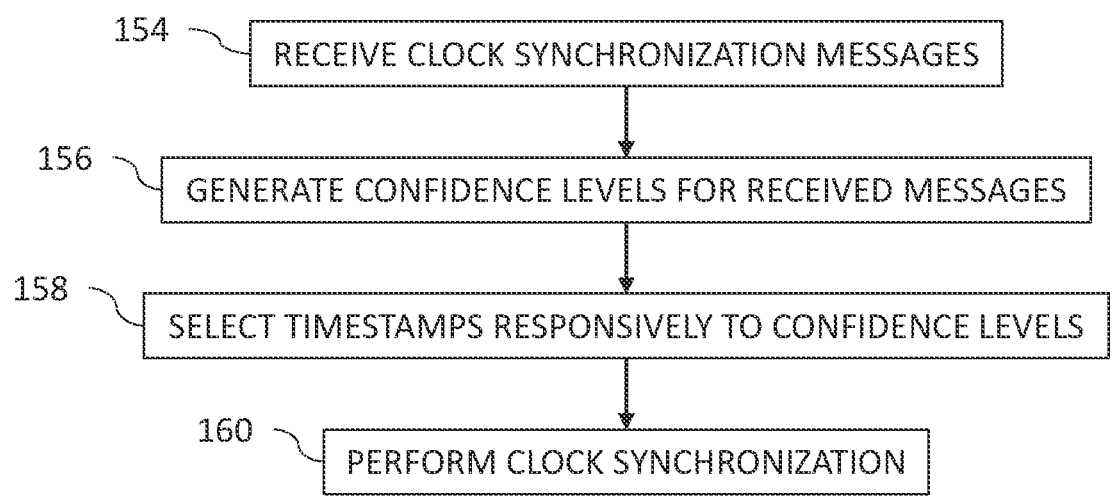
FIG. 16 is a flowchart including steps in a method of operation of the clock synchronization system of FIG. 15.

Reference is now made to FIGS. 15 and 16. FIG. 15 is a schematic view of a clock synchronization system 150 in accordance with an alternative embodiment of the present invention. FIG. 16 is a flowchart including steps in a method of operation of the clock synchronization system 150 of FIG. 15. The clock synchronization system 150 is substantially the same as the clock synchronization system 100 of FIG. 12, except that the master clock synchronization node 102 of the clock synchronization system 150 does not have the ability to generate confidence levels, whereas the slave clock synchronization node 104 includes event processing circuitry 152 which may generate confidence levels for timestamps (generated in the slave clock synchronization node 104 or) received from the master clock synchronization node 102 based on the common traffic pattern between the master clock synchronization node 102 and the slave clock synchronization node 104. This is because in the clock synchronization system 150, the master clock synchronization node 102 and the slave clock synchronization node 104 are connected via a direct cable such as the cable 130 of FIG. 14 and therefore have a common traffic pattern between the master clock synchronization node 102 and the slave clock synchronization node 104.

The master clock synchronization node 102 is configured to send clock synchronization messages 112, 114 (e.g., Sync messages) including respective egress timestamps (e.g., TSE1, TSE2) to the slave synchronization node 104, but without any confidence levels. FIG. 15 shows the slave clock synchronization node 104 sending a delay request message 116 with an egress timestamp TDE1, which is received by the master clock synchronization node 102 and is assigned an ingress timestamp TDI1 by the master clock synchronization node 102. In response, the master clock synchronization node 102 sends a delay request response 118 including the timestamp TDI1.

The clock synchronization circuitry 110 is configured to receive (block 154) clock synchronization messages including respective timestamps. The event processing circuitry 152 of the slave clock synchronization node 104 is configured to generate (block 156) confidence levels for associating with the respective received timestamps, the confidence levels being indicative of respective degrees of confidence of respective accuracy of the respective received timestamps. The clock synchronization circuitry 110 is configured to select (block 158) at least one of the respective timestamps responsively to respective ones of the associated confidence levels. For example, the clock synchronization circuitry 110 selects the timestamps associated with the highest confidence levels or with confidence levels above a given value. The clock synchronization circuitry 110 of the slave clock synchronization node 104 is configured to perform (block 160) a clock synchronization responsively to the selected timestamp(s).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. An event processing system, comprising:
a clock configured to provide time values; and
event processing circuitry to:
generate a confidence level indicative of a degree of confidence of an accuracy of a timestamp, the timestamp being generated for an event responsively to a time value indicative of when an operation associated with the event occurred; and
add the timestamp and the confidence level to a data packet.

2. The system according to claim 1, wherein the event processing circuitry is configured to:
identify occurrence of the event; and
generate the timestamp for the identified event responsively to the time value indicative of when a hardware operation associated with the event occurred.

3. The system according to claim 1, wherein the event processing circuitry is configured to add the timestamp and the confidence level to an event data item.

4. The system according to claim 3, wherein the event data item is a packet notification message.

5. The system according to claim 3, wherein the event data item is a clock synchronization message.

6. The system according to claim 1, wherein the event processing circuitry is configured to generate the confidence level responsively to any one or more factors selected from: a traffic pattern during occurrence of the event; a line speed during occurrence of the event; a bandwidth value during occurrence of the event; a steering engine used during occurrence of the event; hardware performing the hardware operation; a clock state; a queue occupancy; or a PHY protocol used to perform the hardware operation.

7. The system according to claim 1, further comprising:
a network interface configured to receive the data packet over a packet data network; and
packet processing circuitry configured to process the received data packet, and wherein: the event includes the data packet being received by the packet processing circuitry at the time value; and the event processing circuitry is configured to add the timestamp and the confidence level to the data packet.

8. The system according to claim 7, wherein the event processing circuitry is configured to generate the confidence level responsively to any one or more ingress factors selected from: a location of the data packet in a packet processing pipeline when the timestamp was generated; a traffic pattern during ingress of the data packet; a line speed during ingress of the data packet; a bandwidth value during ingress of the data packet; an ingress queue occupancy; a clock state; or a steering engine used during ingress of the data packet.

9. The system according to claim 1, further comprising:
a network interface configured to send the data packet over a packet data network; and
packet processing circuitry configured to process the data packet for sending via the network interface over the packet data network, and wherein: the event includes the data packet being sent over the packet data network at the time value; and the event processing circuitry is configured to add the timestamp and the confidence level to the data packet.

10. The system according to claim 9, further comprising an egress buffer configured to store the data packet prior to sending the data packet over the packet data network, wherein the event processing circuitry is configured to generate the confidence level responsively to a buffer level of the egress buffer at the time value.

11. The system according to claim 9, wherein the event processing circuitry is configured to generate the confidence level responsively to any one or more egress factors selected from: a location of the data packet in a packet processing pipeline when the timestamp was generated; a traffic pattern during egress of the data packet; a line speed during egress of the data packet; a bandwidth value during egress of the data packet; an egress queue occupancy; a clock state; or a steering engine used during egress of the data packet.

12. The system according to claim 1, further comprising a transaction processing device configured to process requests from multiple requesting entities responsively to a timeout which is set responsively to the generated confidence level.

13. An event processing system, comprising:
a clock configured to provide time values;
event processing circuitry to generate a confidence level indicative of a degree of confidence of an accuracy of a timestamp, the timestamp being generated for an event responsively to a time value indicative of when an operation associated with the event occurred; and
a data analyzer configured to receive a dataset including event data items having respective timestamps and respective confidence levels.

14. The system according to claim 13, wherein the data analyzer is configured to:
identify at least one traffic pattern causing some event data items of the respective event data items to have respective ones of the respective confidence levels below a given confidence level; and
issue a command to adjust the identified at least one traffic pattern.

15. The system according to claim 13, wherein the data analyzer is configured to:
reduce the dataset to remove ones of the event data items from the dataset having respective ones of the respective confidence levels which are lower than respective ones of the respective confidence levels of remaining ones of the event data items in the dataset; and
analyze the reduced dataset.

16. The system according to claim 13, wherein the data analyzer is configured to:
select one of the event data items having a highest confidence level of the respective confidence levels; and
analyze the selected event data item.

17. An event processing system, comprising:
a clock configured to provide time values;
event processing circuitry to generate a confidence level indicative of a degree of confidence of an accuracy of a timestamp, the timestamp being generated for an event responsively to a time value indicative of when an operation associated with the event occurred;
a first network node; and
a second network node, the first and second network nodes being connected directly by a cable, wherein:
the first network node comprises first event processing circuitry configured to: identify occurrence of the event; and generate the timestamp for the identified event responsively to the time value indicative of when a hardware operation associated with the event occurred; and
the second network node comprises second event processing circuitry configured to generate the confidence level indicative of the degree of confidence of the accuracy of the timestamp generated by the first network node responsively to a common traffic pattern between the first network node and the second network node.

18. The system according to claim 17, wherein:
the first network node is a master clock synchronization node;
the second network node is a slave clock synchronization node;
the master clock synchronization node is configured to send a clock synchronization message including the timestamp to the slave synchronization node; and
the slave clock synchronization node is configured to perform a clock synchronization responsively to the received clock synchronization message.

19. An event processing system, comprising:
a clock configured to provide time values;
event processing circuitry to generate a confidence level indicative of a degree of confidence of an accuracy of a timestamp, the timestamp being generated for an event responsively to a time value indicative of when an operation associated with the event occurred; and
clock synchronization circuitry configured to:
receive a plurality of clock synchronization messages including respective timestamps, the respective timestamps having associated confidence levels indicative of respective degrees of confidence of respective accuracy of the respective timestamps;
select at least one of the respective timestamps responsively to respective ones of the associated confidence levels; and
perform a clock synchronization responsively to the selected at least one of the respective timestamps.

20. The system according to claim 19, further comprising a master clock synchronization node and a slave clock synchronization node, which includes the clock synchronization circuitry, wherein the master clock synchronization node is configured to send the plurality of clock synchronization messages including respective timestamps and associated confidence levels to the slave clock synchronization node.

21. The system according to claim 19, wherein the clock synchronization circuitry is configured to perform the clock synchronization responsively to the respective timestamps while applying a higher weight to the selected at least one of the respective timestamps.

22. An event processing method, comprising:
providing time values;
generating a confidence level indicative of a degree of confidence of an accuracy of a timestamp, the timestamp being generated for an event responsively to a time value indicative of when an operation associated with the event occurred;
adding the timestamp and the confidence level to a data packet.

23. The method according to claim 22, further comprising adding the timestamp and the confidence level to an event data item.

24. The method according to claim 23, wherein the event data item is a packet notification message.

25. The method according to claim 23, wherein the event data item is a clock synchronization message.

26. The method according to claim 22, wherein the generating the confidence level is performed responsively to any one or more factors selected from: a traffic pattern during occurrence of the event; a line speed during occurrence of the event; a bandwidth value during occurrence of the event; a steering engine used during occurrence of the event; hardware performing the hardware operation; a queue occupancy; a clock state; or a PHY protocol used to perform the hardware operation.

27. The method according to claim 22, further comprising:
receiving the data packet over a packet data network;
processing the received data packet, the event including the data packet being received at the time value; and
adding the timestamp and the confidence level to the data packet.

28. The method according to claim 27, wherein the generating the confidence level is performed responsively to any one or more ingress factors selected from: a location of the data packet in a packet processing pipeline when the timestamp was generated; a traffic pattern during ingress of the data packet; a line speed during ingress of the data packet; a bandwidth value during ingress of the data packet; an ingress queue occupancy; a clock state; or a steering engine used during occurrence of the event.

29. The method according to claim 22, further comprising:
sending the data packet over a packet data network;
processing the data packet for sending over the packet data network, the event including the data packet being sent over the packet data network at the time value; and
adding the timestamp and the confidence level to the data packet.

30. The method according to claim 29, further comprising storing the data packet in an egress buffer prior to sending the data packet over the packet data network, wherein the generating the confidence level is performed responsively to a buffer level of the egress buffer at the time value.

31. The method according to claim 29, wherein the generating the confidence level is performed responsively to any one or more egress factors selected from: a location of the data packet in a packet processing pipeline when the timestamp was generated; a traffic pattern during egress of the data packet; a line speed during egress of the data packet; a bandwidth value during egress of the data packet; an egress queue occupancy; a clock state; or a steering engine used during egress of the data packet.

32. The method according to claim 22, further comprising:
identifying occurrence of the event; and
generating the timestamp for the identified event responsively to the time value indicative of when a hardware operation associated with the event occurred.

33. The method according to claim 22, further comprising processing requests from multiple requesting entities responsively to a timeout which is set responsively to the generated confidence level.

34. An event processing method, comprising:
providing time values;
generating a confidence level indicative of a degree of confidence of an accuracy of a timestamp, the timestamp being generated for an event responsively to a time value indicative of when an operation associated with the event occurred;
identifying, in a first network node, occurrence of the event;
generating, in the first network node, the timestamp for the identified event responsively to the time value indicative of when a hardware operation associated with the event occurred; and
generating in a second network node connected directly by a cable to the first network node, the confidence level indicative of the degree of confidence of the accuracy of the timestamp generated by the first network node responsively to a common traffic pattern between the first network node and the second network node.

35. The method according to claim 34, wherein:
the first network node is a master clock synchronization node;
the second network node is a slave clock synchronization node; and
the method further comprising:
the master clock synchronization node sending a clock synchronization message including the timestamp to the slave synchronization node; and
the slave synchronization node performing a clock synchronization responsively to the received clock synchronization message.

36. An event processing method, comprising:
providing time values;
generating a confidence level indicative of a degree of confidence of an accuracy of a timestamp, the timestamp being generated for an event responsively to a time value indicative of when an operation associated with the event occurred;
receiving a plurality of clock synchronization messages including respective timestamps, the respective timestamps having associated confidence levels indicative of respective degrees of confidence of respective accuracy of the respective timestamps;
selecting at least one of the respective timestamps responsively to respective ones of the associated confidence levels; and
performing a clock synchronization responsively to the selected at least one of the respective timestamps.

37. The method according to claim 36, wherein performing the clock synchronization includes performing the clock synchronization responsively to the respective timestamps while applying a higher weight to the selected at least one of the respective timestamps.

38. The method according to claim 36, further comprising a master clock synchronization node sending the plurality of clock synchronization messages including respective timestamps and associated confidence levels to a slave clock synchronization node, wherein the clock synchronization is performed by the slave clock synchronization node.

39. An event processing method, comprising:
providing time values;
generating a confidence level indicative of a degree of confidence of an accuracy of a timestamp, the timestamp being generated for an event responsively to a time value indicative of when an operation associated with the event occurred; and
receiving a dataset including event data items having respective timestamps and respective confidence levels.

40. The method according to claim 39, further comprising:
reducing the dataset to remove ones of the event data items from the dataset having respective ones of the respective confidence levels which are lower than respective ones of the respective confidence levels of remaining ones of the event data items in the dataset; and
analyzing the reduced dataset.

41. The method according to claim 39, further comprising:
- selecting one of the event data items having a highest confidence level of the respective confidence levels; and
- analyzing the selected event data item.

42. The method according to claim 39, further comprising:
- identifying at least one traffic pattern causing some event data items of the respective event data items to have respective ones of the respective confidence levels below a given confidence level; and
- issuing a command to adjust the identified at least one traffic pattern.

* * * * *